United States Patent [19]
Muszynski

[11] Patent Number: 5,623,484
[45] Date of Patent: Apr. 22, 1997

[54] METHOD AND APPARATUS FOR CONTROLLING SIGNAL QUALITY IN A CDMA CELLULAR TELECOMMUNICATIONS

[75] Inventor: Peter Muszynski, Helsinki, Finland

[73] Assignee: Nokia Telecommunications Oy, Espoo, Finland

[21] Appl. No.: 307,689

[22] PCT Filed: Sep. 24, 1993

[86] PCT No.: PCT/FI93/00386

§ 371 Date: Dec. 15, 1994

§ 102(e) Date: Dec. 15, 1994

[87] PCT Pub. No.: WO95/08876

PCT Pub. Date: Mar. 30, 1995

[51] Int. Cl.⁶ ............................................. H04J 13/04
[52] U.S. Cl. .................................... 370/335; 455/56.1
[58] Field of Search ............................ 370/17, 13, 13.1, 370/95.1, 95.2, 95.3, 85.7, 18, 85.3; 375/205, 200, 208, 278, 296; 379/59, 60, 61, 94, 95, 96, 58, 63; 455/33.1, 34.1, 59, 60, 38.3, 33.2, 33.3, 33.4, 54.2, 56.1; 371/37.9, 38.1, 39.1, 64

[56] References Cited

U.S. PATENT DOCUMENTS

| | | | |
|---|---|---|---|
| 5,265,119 | 11/1993 | Gilhousen et al. | 370/205 |
| 5,267,261 | 11/1993 | Blakeney, II et al. | 375/205 |
| 5,301,356 | 4/1994 | Bodin et al. | 455/34.1 |

FOREIGN PATENT DOCUMENTS

| | | |
|---|---|---|
| 115139 | 8/1984 | European Pat. Off. . |
| 548939 | 6/1993 | European Pat. Off. . |
| 579372 | 1/1994 | European Pat. Off. . |

OTHER PUBLICATIONS

Allen Salmasi and Klein S. Gilhousen "On the System Design Aspects of Code Division Multiple Access (CDMA) Applied to Digital Cellular and Personal Communications Networks", reprinted from Proceedings of the 41st IEEE Vehicular Technology Conference, St. Louis, Mo., May 19–22, 1991.

Primary Examiner—Douglas W. Olms
Assistant Examiner—Dang Ton
Attorney, Agent, or Firm—Cushman Darby & Cushman IP Group of Pillsbury Madison & Sutro LLP

[57] ABSTRACT

A system and a method for controlling the radio signal quality between a plurality of mobile stations and a plurality of base stations connected to a mobile switching center of a code division multiple access (CDMA) cellular telecommunication system. Each base station is adapted to measure the quality of each active CDMA communication link and to report for each active CDMA radio communication to the mobile switching center the corresponding measured communication signal quality. The mobile switching center is adapted to perform an averaging process on the reported quality measure values, in order to calculate a recommended quality measure threshold value. The base stations are adapted to receive the recommended threshold value for use in an uplink closed-loop power control algorithm for the mobile stations.

12 Claims, 3 Drawing Sheets

METHOD AND APPARATUS FOR CONTROLLING SIGNAL QUALITY IN A CDMA CELLULAR TELECOMMUNICATIONS

FIELD OF THE INVENTION

The present invention relates to cellular telecommunications systems. More specifically, the present invention relates to a system and a method for controlling the radio signal quality between a plurality of mobile stations (MS) communicating via a plurality of base stations (BS) connected to a mobile switching center (MSC) of a code division multiple access (CDMA) cellular telecommunications system.

DESCRIPTION OF PRIOR ART

The use of code division multiple access (CDMA) modulation is but one of several techniques enabling digital communications among a number of mobile users utilizing a common part of the radio spectrum, as is the case for cellular telecommunications systems. If appropriately embodied, a CDMA cellular telecommunications system possesses several advantages such as increased traffic handling capacity compared to designs based on frequency division multiple access (FDMA) or time division multiple access (TDMA) radio access technologies. An exemplary application of CDMA to cellular telecommunications systems has been substantially described in "On the System Design Aspects of Code Division Multiple Access (CDMA) Applied to Digital Cellular and Personal Communications Networks", Allen Salmasi and Klein S. Gilhousen, presented at the 41st IEEE Vehicular Technology Conference on May 19–22, 1991 in St. Louis, Mo.

In the publication mentioned above, a direct-sequence CDMA (DS-CDMA, or shortly, CDMA in the following) technique is described, in which a number of user mobile stations (MS) communicate via a CDMA radio spread spectrum signals with base stations (BS, also referred to as cell sites) in the uplink (mobile station to base station) and downlink (base station to mobile station) directions. The base stations convert these CDMA radio signals originating from, respectively terminating at, the mobile station of the user, into a form appropriate for use in conjunction with terrestrial telecommunications transmission equipment such as the commonly deployed Pulse Code Modulation (PCM) circuit facilities. The base stations further relay these user signals in the uplink and downlink directions to the mobile switching center (MSC, also referred to as mobile telephone switching office (MTSO)) for further processing.

The user communication signals mentioned above comprise digitized voice signals and control information (also referred to as signaling). The MSC performs multiplexing and conversion operations on the mentioned tributaries and relays the voice signal to another user, e.g. within a Public Switched Telephone Network (PSTN). The MSC also interprets, reacts upon and generates signalling information, thus controlling the overall communication link between the users. These communications link control functions comprise the management of general call-related events such as call setup or tear down as well as CDMA radio link-related events such as the deterioration of the CDMA radio link quality and subsequent handoff initiation.

If CDMA is deployed within the typical medium-to-large sized cells of land mobile telecommunications systems, then the average time delay spread of the multipath radio propagation environment is usually larger than the chip duration of the DS-CDMA signal. This forces CDMA to operate in an asynchronous mode with the consequence that the orthogonality of the spread spectrum multiple access user signals cannot be achieved by means of orthogonal spreading codes alone. Therefore, communications suffer from system self-induced interference, not only among signals originating from different cells, but in addition to that also considerably within a single cell (referred to as CDMA intra-cell interference). For such CDMA cellular systems, it is therefore an important overall system design objective to minimize any excessive CDMA interference among the communicating users and complementary, to capture and utilize as much energy from a desired CDMA user signal as possible. This system design requirement, although a generic requirement applicable to any multiple access method within cellular telecommunications systems, is less stringent for FDMA and TDMA based systems in which intra-cell interference is avoided by the intrinsic properties of the respective multiple access method and inter-cell interference is limited by means of pre-planned cellular frequency re-use schemes. Thus, CDMA unlike FDMA or TDMA operates in a strictly interference limited manner.

Several methods implementing the CDMA system design objective mentioned above can be readily identified for the above referenced exemplary embodiment of a CDMA cellular telecommunications system.

For example, mobile-assisted soft handoff in conjunction with signal diversity combining comprises the method of relaying the user communication signals on the transmission segment between MS and MSC concurrently via a first and a second BS in the uplink and downlink direction and performing signal diversity reception at the MS and MSC in order to enhance the user signal quality. This method is invoked by the MSC when an MS communicating initially with only a first BS moves into the overlapping coverage areas of this first BS and a second BS and has reported the availability of a sufficiently strong signal from this second BS to the MSC. At no time instant during soft handoff in conjunction with signal diversity combining does the MS interrupt its communications with the MSC.

Another embodiment of the previously mentioned system design objective is the method of closed loop power control which will be summarized in the following and to which the present invention is closely related.

The closed loop power control method has the objective to keep the received uplink signal-to-interference plus noise ratio (SINR) of all uplink CDMA signals close to a predetermined threshold value, even against the background of rapidly changing radio propagation channels undergoing fast and slow fading processes. For this purpose, the BS estimates periodically the SINR from each MS CDMA uplink communication and subsequently transmits an appropriate power control command on the downlink communication channel to the MS which in turn sets the CDMA transmitter power accordingly. Ideally, the CDMA uplink signals from all connected MS stations are received at the BS with the same, and, in addition to that, minimum SINR necessary in order to maintain the communication link subject to the predetermined signal quality threshold without causing excessive interference to neighboring base stations.

The reason behind this closed loop power control arrangement is that the SINR is intimately related to the quality of the CDMA communications signal as it is a key parameter in determining the bit error rate (BER) of the digital CDMA demodulation process. The BER itself, determines the frame erasure rate (FER) of the digitally vocoded and framed voice signals and thus the quality of the voice signal as perceived by the user.

Thus, the intelligent control of the SINR of the individual CDMA communication links is an important tool for the efficient operation of a CDMA cellular telecommunications system. If done properly, it allows high capacity, in particular soft capacity during periods of system overload or unequal load, and user specific signal quality levels.

The present invention describes a system and a method with the objective to optimize the capacity of a CDMA cellular telecommunications system by balancing the received SINRs in the system area covered by a particular MSC.

SUMMARY OF THE INVENTION

The present invention relates to CDMA closed loop power control techniques, as substantially described in "On the System Design Aspects of Code Division Multiple Access (CDMA) Applied to Digital Cellular and Personal Communications Networks", Allen Salmasi and Klein S. Gilhousen, presented at the 41st IEEE Vehicular Technology Conference on May 19–22, 1991 in St. Louis, Mo.

The present invention describes a system and a method to control the SINR thresholds, also referred to as SINR setpoints, by means of signalling between the base stations and the MSC controlling those base stations. More precisely, the system of the invention is characterized in that

- each base station is adapted to periodically report for each active CDMA radio communication to the mobile switching center the corresponding measured signal-to-interference plus noise ratio (SINR);
- the MSC is adapted to perform an averaging process on the reported SINR values, in order to calculate a recommended SINR setpoint value;
- the base stations are adapted to receive the recommended SINR setpoint value for use in an uplink closed loop power control algorithm for the mobile stations (MS), in order to provide a balanced level control of the SINR values in the whole CDMA cellular telecommunications system area controlled by the mobile switching center.

In a preferred embodiment of the present invention, the MSC performs firstly a time-averaging operation on the reported SINR values in order to eliminate variations due to fast fading on the MS uplink. These time-averaged SINR values are then averaged over all active CDMA communications within that particular system area controlled by the MSC, in order to obtain an optimal SINR setpoint, reflecting the current system load. This SINR setpoint value is then signalled back to the involved base stations which will use it as a target value for the uplink, fast, closed-loop power control on each of the CDMA communication links.

In other words, the scheme described above provides an outer power control loop between a BS and the controlling MSC and provides a control apparatus and method for the SINR setpoints, as used by the fast, closed-loop power control scheme between MS and BS. It should be understood that this outer power control loop operates at a much lower frequency (e.g. every 20 ms) than the fast power control loop, typically being invoked every 1.25 ms.

The effect of these averaging and loop-back operations is that the system equalizes the perceived signal quality (as represented by the SINR values) among the active user population within the MSC system area. Thus, this enables soft capacity to be offered and allows the system to take a capacity advantage in case of unequally loaded base stations.

BRIEF DESCRIPTION OF THE DRAWINGS

The features and advantages of the present invention will become more apparent from the detailed description set forth below when taken in conjunction with the drawings in which.

DETAILED DESCRIPTION OF THE PREFERRED EMBODIMENTS

Figure 1:
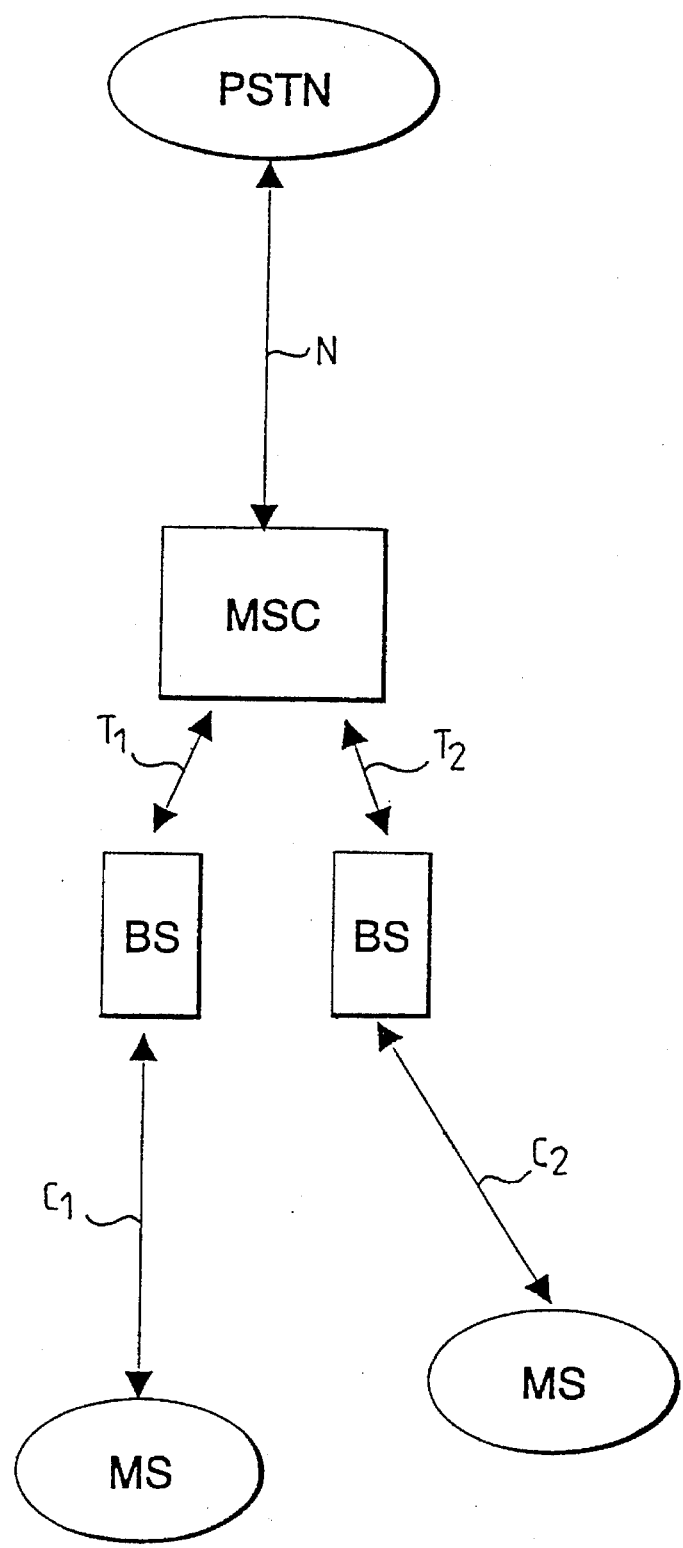
FIG. 1 is a schematic overview of an exemplary CDMA cellular telecommunications system in accordance with the present invention.

FIG. 1 shows an exemplary embodiment of a CDMA cellular telecommunications system to which the present invention relates. Two exemplary independent, active user communications are shown in FIG. 1. User mobile stations MS communicate with base stations BS, of which only two are shown, by means of digital CDMA radio links $C_1$, $C_2$. The base stations convert these CDMA radio signals originating from the user's MS into a form appropriate for the use in conjunction with terrestrial telecommunications transmission equipment $T_1$, $T_2$, such as the commonly deployed Pulse Code Modulation (PCM) circuit facilities. The base stations further relay these user signals in the uplink direction to the mobile switching center MSC for further processing. Similar processing takes place in the downlink direction from the MSC to BS and further to the MS.

In the preferred embodiment of the present invention, the user communication signals, comprise digitized voice or data and are multiplexed together with the signalling information related to this connection. They are carried in a digital, framed format suitable for the terrestrial transmission lines $T_1$, $T_2$ between the base stations BS and the MSC. These frames are subsequently referred to as transcoder & combiner frames.

The MSC performs multiplexing and conversion operations on the transcoder & combiner frames mentioned above, and relays the transcoded voice signal to another user within the public switched telephone network (PSTN) via a trunk facility N. The MSC also interprets, reacts upon and generates signalling information, thus controlling the overall communication link between the system users. These communications link control functions comprise the management of general call-related events, such as call setup or tear down, as well as CDMA radio link-related events, such as the deterioration of the CDMA radio link quality and subsequent handoff initiation.

In addition to this user information, the transcoder & combiner frames related to an active communication also contain in the uplink direction information supplied by the BSs which is indicative of the uplink CDMA radio signal quality and is used, e.g. for the signal diversity combining within the MSC during a soft handoff with signal diversity combining. In the preferred embodiment of the present invention, the uplink SINR as measured by the BS is used as signal quality estimation. Moreover, the MSC uses the reported SINR values to estimate the current load in the system and to calculate a SINR setpoint to be used subsequently by the base stations as a threshold value for the closed loop power algorithm. To this end, the MSC inserts this calculated SINR setpoint in the downlink stream of the transcoder & combiner frames passing along digital links $T_1$, $T_2$. It should be understood that other signal quality indicators, such as BER (Bit Error Rate) or pseudo BER estimates as defined in the frame decoding phase, could also be used as a signal quality measure, without changing the generic principles of the present invention.

It should also be understood that there can be, and usually is, more than one MSC within a CDMA cellular telecommunications system; and there can be any number of base stations BS per mobile switching center MSC.

Figure 2:
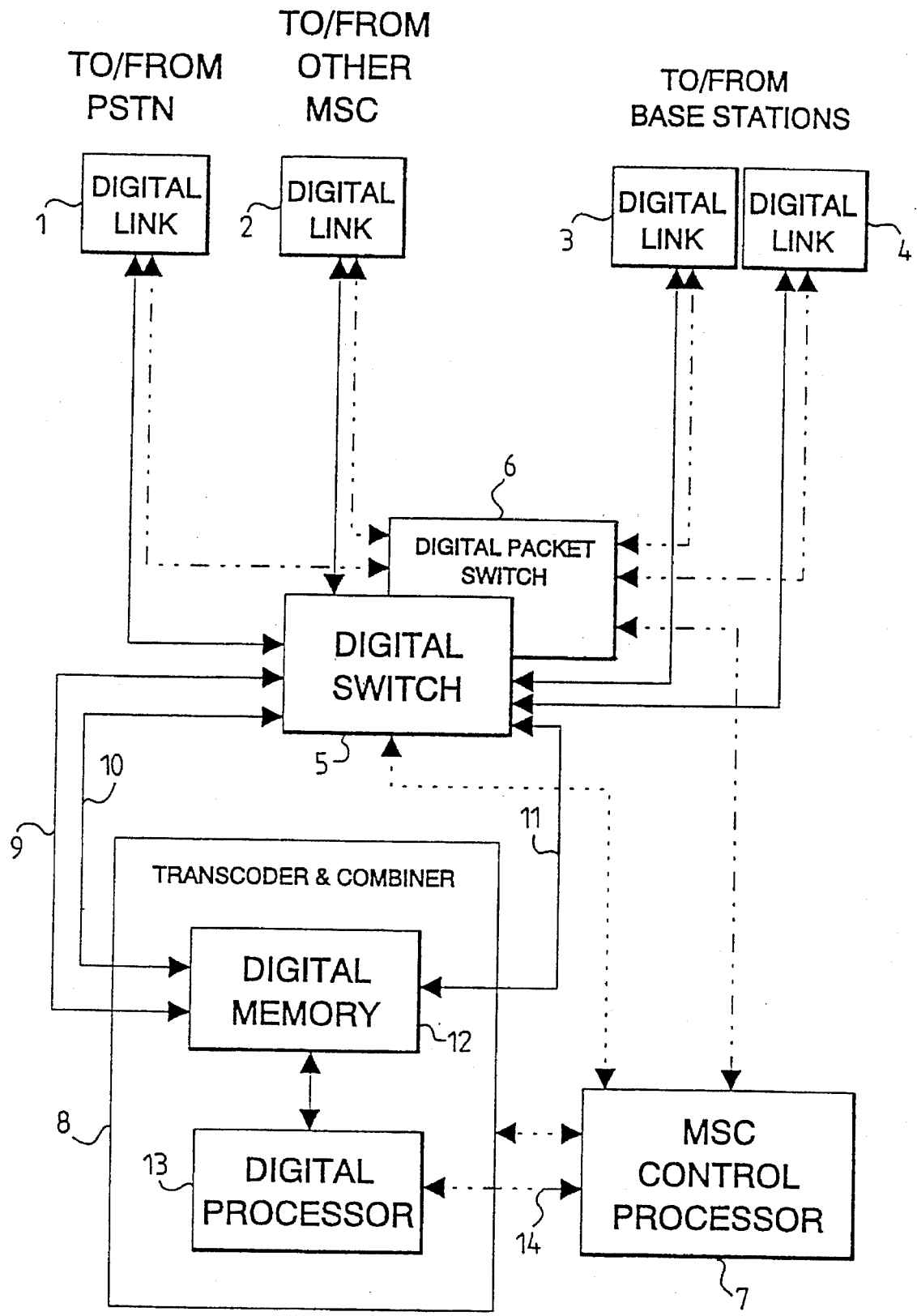
FIG. 2 is a block diagram showing a preferred embodiment of a mobile switching center (MSC) for use within a CDMA cellular telecommunications system.

FIG. 2 shows an exemplary embodiment of an MSC used in a CDMA cellular telecommunications system to which the present invention relates.

Digital links 1, 2, 3 and 4 connect the MSC with the PSTN, other mobile switching centers and base stations, respectively. These digital links carry the user information such as voice and, additionally, signalling information. The preferred embodiment of the present invention assumes that the signalling information is of packetized type and is multiplexed together with the user information onto one and the same physical transmission facility. T1 transmission facilities together with Signalling System No 7 may serve as an exemplary embodiment of such a digital link arrangement.

The user information stream is switched among the mentioned entities by means of a digital switch 5. The corresponding signalling information is transmitted, received and relayed by a packet switch 6. Packet switch 6 is also connected to a MSC control processor 7 which acts as a signalling information source and sink, respectively. The MSC control processor 7 interprets and reacts upon signalling messages addressed to it and may also solicit signalling messages to other entities whenever appropriate. The MSC control processor 7 also controls the connection arrangements within the digital switch 5 in accordance with the call status. Moreover, the MSC control processor 7 allocates and releases transcoder & combiner equipment 8 during call setup and tear down from a corresponding resource pool (only one piece of this transcoder & combiner equipment 8 is shown in the figure) and switches it by means of the digital switch 5 between the external digital links 3, 4, 1 (circuits to/from base stations, respectively PSTN), thereby using the internal circuits 9, 10 and 11.

Transcoder & combiner equipment 8 is needed in order to convert between the typically μ-law-encoded voice as used in the PSTN and the low rate digital voice coding such as CELP used on the radio links. In addition to the transcoding function, transcoder & combiner equipment 8 also implements the signal diversity combing in the uplink direction and signal duplication in the downlink direction during soft handoff (only 2-branch BS diversity is depicted in FIG. 2). Finally, transcoder & combiner equipment 8 participates in the outer power control loop to which the present invention relates.

The transcoder & combiner frames arriving and leaving on the circuits 9, 10, 11 are buffered in the digital memory 12 for the uplink and downlink direction, respectively. Digital processor 13 reads and writes cyclically the transcoder & combiner frames from and to digital memory 12. In the uplink direction, the SINR used as signal quality indication and attached to the corresponding transcoder & combiner frames arriving from the base stations via circuits 9, 10 into the memory 12, is inspected and processor 13 performs the diversity selection based on these indications during soft handoff. The selected frames are then transcoded and passed on towards the PSTN via circuit 11. In the downlink direction, voice samples arriving from the PSTN via circuit 11 into the memory 12 are transcoded and packed into transcoder & combiner frames by processor 13 and passed on towards the base stations via circuits 9 and/or 10.

Digital processor 13 also extracts, respectively inserts, the reported SINR values, respectively calculated SINR setpoint values from, respectively into, the transcoder & combiner frames. To this end, processor 13 communicates via circuit 14 with MSC control processor 7. Thus, MSC control processor 7 receives the reported SINR values from all active transcoder & combiner units (i.e. from all active communications within the MSCs system area) and can further process them. In the preferred embodiment of the present invention, the MSC control processor 7 performs firstly a time averaging operation on the reported SINR values in order to eliminate variations due to fast fading on the MS uplink. These time averaged SINR values are then averaged over all active communications in order to obtain an optimal SINR setpoint, reflecting the current system load. This SINR setpoint value is then signalled back to digital processors 13 which, in turn, will provide this value to the BSs via the downlink transcoder & combiner frames.

It should be understood that other implementations of the processing mentioned above can be readily conceived by any person skilled in the art. For example, digital processor 13 could perform the SINR time-averaging and send the averaged values to MSC control processor 7 for further processing. Or, there could be also a dedicated processor for the SINR data processing, different from MSC control processor 7.

The transcoder & combiner equipment 8, by means of the digital processor 13 also extracts, respectively inserts, the user signalling information from, respectively into, the transcoder & combiner frames and offers, respectively receives, this signalling information to MSC control processor 7 via a circuit 14. By these means, MSC control processor 7 receives MS signalling information such as pilot signal quality measurement reports. Thus, MSC control processor 7 possesses the necessary information to initiate and terminate handoffs. Furthermore, by these means MSC control processor 7 can issue the appropriate handoff commands to the MS via circuits 14, 9, 10 and links 3 and 4 as well as via the digital packet switch 6 and link 2 to other mobile switching centers, should this be required.

Figure 3:
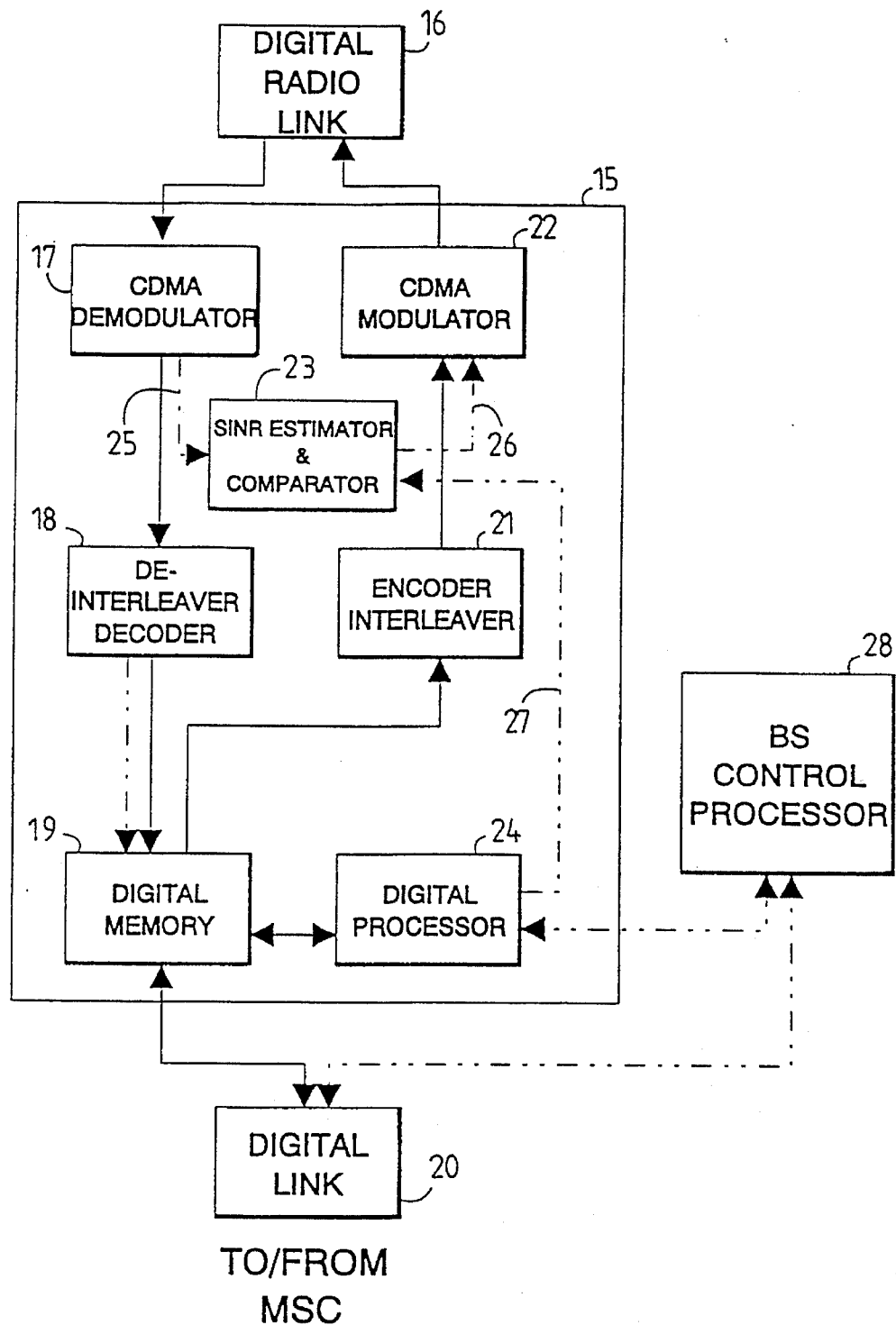
FIG. 3 is a block diagram showing a preferred embodiment of a base station (BS) for use within a CDMA cellular telecommunications system.

FIG. 3 shows an exemplary embodiment of a base station used in a CDMA cellular telecommunications system to which the present invention relates. Block 15 shows the apparatus required to support a single CDMA communication within a base station, referred to as CDMA channel equipment (only one is shown).

In the uplink direction, the CDMA user communication signals are received from the digital CDMA radio link 16, despread and demodulated by the CDMA demodulator 17, de-interleaved and channel decoded by the de-interleaver & decoder 18, converted into transcoder & combiner frames and buffered for the terrestrial transmission within digital memory 19 and finally transmitted on the digital link 20 towards the MSC.

In the downlink direction, the transcoder & combiner frames are received from the MSC via digital link 20, buffered and converted into a presentation appropriate for the base station within digital memory 19, channel encoded and interleaved by encoder & interleaver 21, CDMA modulated and spread by the CDMA modulator 22 and finally transmitted on the digital radio link 16.

The uplink CDMA closed-loop power control algorithm is implemented within the CDMA channel equipment of the BS by means of the SINR estimator & comparator 23, the CDMA modulator 22 and the digital processor 24.

The SINR estimator & comparator 23 receives the digital CDMA baseband signal from the CDMA demodulator 17 via circuit 25. SINR estimator & comparator 23 estimates the instantaneous SINR of the user signal on a symbol-by-symbol basis and time averages over the duration of a few symbols to obtain a local mean SINR estimate. SINR estimator & comparator 23 is provided with a target SINR setpoint from digital processor 24. SINR estimator & comparator 23 compares the local mean SINR value with this target SINR setpoint and depending on the comparison result instructs the CDMA modulator 22 via circuit 26 to issue the appropriate power control command towards the MS.

In a preferred embodiment of the present invention, it is assumed that the CDMA baseband signal is convolutionally encoded by the MS on a frame-by-frame basis and that channel decoder unit of deinterleaver & decoder 18 uses a soft decision Viterbi decoding technique to decode the individual frames. Thus, deinterleaver & decoder 18 may generate on a frame-by-frame basis a signal which is indicative of the frame SINR after channel decoding. It should be understood that this frame SINR value may be different from the previously mentioned local mean SINR estimate. This frame SINR, indicative of the signal quality of an individual CDMA user information frame, as received by the BS, is multiplexed together with the user information and passed on to digital memory 19.

Digital processor 24 in conjunction with the buffer memory 19 performs generally the packing and unpacking of the BS internal representation of the CDMA user communications signal to and from transcoder & combiner frames in the uplink, respectively downlink direction.

Moreover, digital processor 24 also multiplexes the previously mentioned frame SINR value together with the user communications signal onto transcoder & combiner frames in the uplink direction towards the MSC. In the downlink direction digital processor 24 in conjunction with the buffer memory 19 extracts the SINR setpoint defined by the MSC. Digital processor 24 processes this SINR setpoint, computes an appropriate target SINR threshold appropriate to the SINR estimator & comparator 23, and provides this value to the SINR estimator & comparator 23 via circuit 27 for use in the CDMA closed loop power control algorithm. It should be understood that other signal quality indicators, such as BER (Bit Error Rate) or pseudo BER estimates as defined in the frame-decoding phase, could also be used as a signal quality measure, without changing the generic principles of the present invention.

The base station further comprises a control processor 28. The BS control processor 28 receives and transmits signalling information from and to digital link 20 connected to the MSC. The base station control processor 28 performs the resource management of the BS, such as the allocation and release of CDMA channel equipment for user connections (calls). The BS control processor 28 thus responds to CDMA channel assignment requests related to a call setup as well as to CDMA channel assignment requests related to soft handover requests from the MSC.

The description provided herein of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

I claim:

1. A system for controlling the quality of radio signals on active code division multiple access (CDMA) communication links between a plurality of mobile stations and a plurality of base stations connected to a mobile switching center of a CDMA cellular telecommunications system, wherein:

each of said base stations is adapted to measure the quality of each said active CDMA communication link and to report, for each active CDMA radio communication over each said link, to said mobile switching center, each corresponding measured value of communication signal quality;

said mobile switching center is adapted to perform an averaging of said measured values of communication signal quality, for calculating a recommended quality measure threshold value;

said base stations are adapted to receive said recommended quality measure threshold value from said mobile switching center; and said base stations are arranged to control power of their respective transmissions by said mobile stations, by an uplink closed-loop power control algorithm, for maintaining the quality of radio signals on each said active CDMA communication link maximally close to said recommended threshold value.

2. A system according to claim 1, wherein:

said mobile switching center is adapted to perform an averaging operation on said measured values of quality reported thereto, over some or all of the active CDMA communications links controlled by said mobile switching center.

3. A system according to claim 1, wherein:

each said measured value of quality is a signal-to-interference-plus noise ratio.

4. A system according to claim 2, wherein:

each said measured value of quality is a signal-to-interference-plus noise ratio.

5. A system according to claim 1, wherein:

each said measured value of quality is a bit error rate.

6. A system according to claim 2, wherein:

each said measured value of quality is a bit error rate.

7. A method for controlling the quality of radio signals on active code division multiple access (CDMA) communication links between a plurality of mobile stations and a plurality of base stations connected to a mobile switching center of a CDMA cellular telecommunications system, wherein:

each of said base stations measuring the quality of each said active CDMA communication link and reporting, for each active CDMA radio communication over each said link, to said mobile switching center, each corresponding measured value of communication signal quality;

said mobile switching center performing an averaging of said measured values of communication signal quality, and calculating a recommended quality measure threshold value;

said base stations receiving said recommended quality measure threshold value from said mobile switching center; and said base stations controlling power of their respective transmissions by said mobile stations, by an uplink closed-loop power control algorithm, for maintaining the quality of radio signals on each said active CDMA communication link maximally close to said recommended threshold value.

8. A method according to claim 7, wherein:

said mobile switching center performs an averaging operation on said measured values of quality reported thereto, over some or all of the active CDMA communications links controlled by said mobile switching center.

9. A method according to claim 7, wherein:

each said measured value of quality is a signal-to-interference-plus noise ratio.

10. A method according to claim 8, wherein:

each said measured value of quality is a signal-to-interference-plus noise ratio.

11. A method according to claim 7, wherein:

each said measured value of quality is a bit error rate.

12. A method according to claim 8, wherein:

each said measured value of quality is a bit error rate.

* * * * *